Nov. 28, 1967   W. B. BROCK   3,355,208
MOTOR ACTUATED BUMPER
Filed Aug. 8, 1966
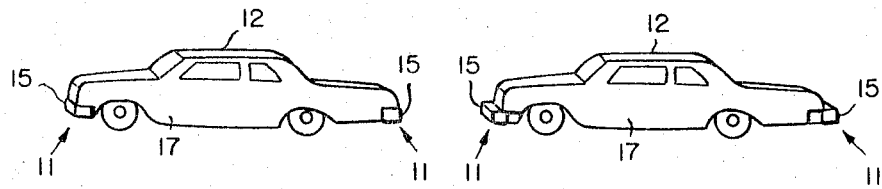
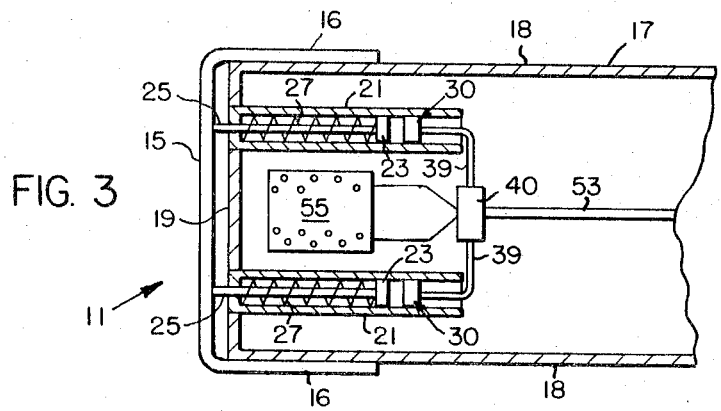
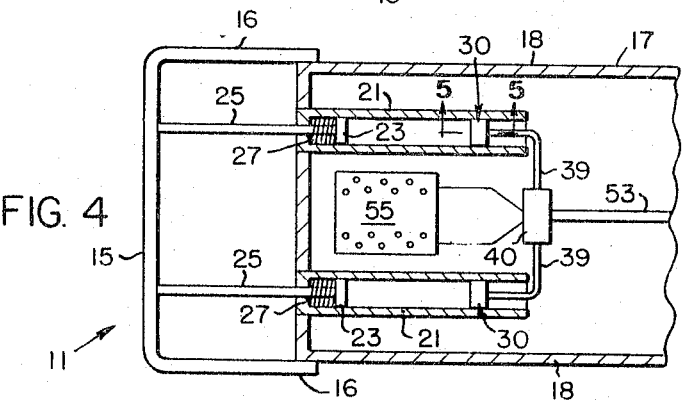
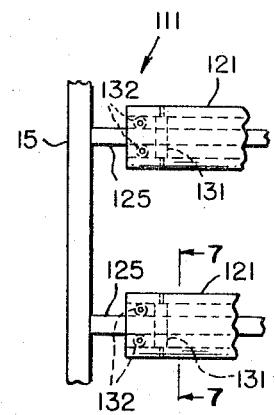
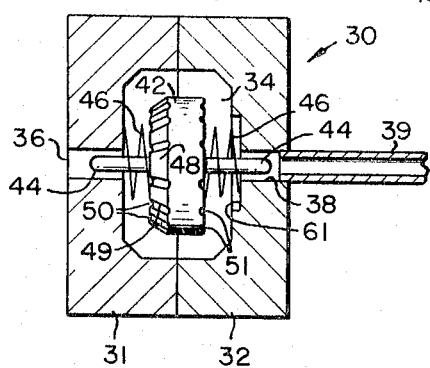
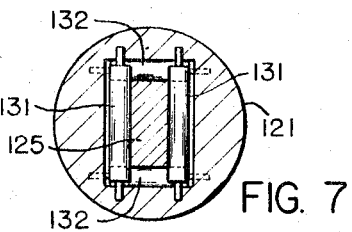
INVENTOR.
WALTER B. BROCK
BY
ATTORNEY

United States Patent Office

3,355,208
Patented Nov. 28, 1967

3,355,208
MOTOR ACTUATED BUMPER
Walter B. Brock, R.D. 1, Victor, N.Y. 14564
Filed Aug. 8, 1966, Ser. No. 571,043
6 Claims. (Cl. 293—9)

ABSTRACT OF THE DISCLOSURE

An automotive vehicle is provided at front and rear with bumpers which are extended forwardly and rearwardly, respectively, from the vehicle by hydraulic pressure when the vehicle's engine is running. If either bumper, when extended, collides with an object, a throttle valve in the fluid supply line slows inward movement of the bumper, thereby cushioning the impact and shock. When the engine is stopped springs retract the bumpers.

---

This invention relates to a safety device for automotive vehicles, and more particularly to an improved safety bumper assembly for automobiles.

Pneumatically and spring-cushioned bumpers have been proposed for automobiles, but have not proved satisfactory. A pneumatically cushioned bumper, for example, has the disadvantage that, upon colliding with an object, it must recoil a very considerable distance, before the gas or air is compressed sufficiently to develop the required resistance to further recoil. A spring-cushioned bumper has the same defect, plus a tendency to rebound, which could jar or even injure the occupants of the vehicle. Such bumpers also have the disadvantage that, when extended, there are gaps between the bumper and the vehicle. Because of these gaps closely passing vehicles may lock bumpers, thereby increasing rather than reducing traffic hazards.

An object of this invention is to provide an energy-absorbing, shock-absorbing safety bumper assembly for an automotive vehicle, which will substantially reduce the shocks of collisions, thereby to minimize injuries and avoid fatalities.

Another object of this invention is to provide for an automotive vehicle an improved bumper, which will minimize parking problems.

A more specific object of this invention is to provide a safety bumper, which develops its maximum energy-absorbing potential immediately upon being struck.

It is an object also of this invention to provide an improved safety bumper which will function satisfactorily both for head-on collisions and for collisions in which the bumper is struck at an oblique angle.

Other objects of the invention will be apparent hereinafter from the specification and from the recital of the appended claims, particularly when read in conjunction with the accompanying drawing.

In the drawing:

FIG. 1 is a perspective view of an automobile having a pair of safety bumper assemblies made in accordance with one embodiment of this invention, the bumpers of the assemblies being shown in their retracted positions;

FIG. 2 is a view similar to FIG. 1, but illustrating the bumpers in their advanced positions;

FIG. 3 is an enlarged, fragmentary sectional view taken in a horizontal plane through the center of one of the bumper assemblies illustrated in FIG. 1 and showing the bumper in retracted position;

FIG. 4 is a view similar to FIG. 3, but illustrating the bumper of this assembly in its advanced position;

FIG. 5 is an enlarged, fragmentary sectional view taken along the line 5—5 in FIG. 4 looking in the direction of the arrows;

FIG. 6 is a fragmentary plan view of a modified bumper assembly; and

FIG. 7 is an enlarged, fragmentary sectional view taken along the line 7—7 in FIG. 6 looking in the direction of the arrows.

The safety bumper illustrated in the drawing may be mounted both at the front and/or rear end of an automobile. Each bumper is connected by a pair of rods to two pistons, which reciprocate in cylinders that extend longitudinally of the vehicle. When the vehicle is in operation, its drive shaft operates a pump, which forces hydraulic fluid under pressure into the cylinders, thereby forcing their pistons outwardly of their cylinders against the resistance of a pair of compression springs, one each of which is mounted in each cylinder. A relief valve associated with the hydraulic pump prevents the pressure in the cylinders from exceeding that which is necessary to hold the bumper in its extreme advanced position.

Mounted in each cylinder is a normally open, spring-loaded valve. If the advanced bumper is struck suddenly as the result of a collision, the pistons are instantly urged rearwardly in the two cylinders, thus rapidly increasing the pressure in the cylinders. The surge in pressure causes the spring-loaded valves in the cylinders to be closed trapping the fluid in the cylinders, thereby maintaining the bumper in an advanced position, where it can absorb the full shock of the collision. The slight reverse movement of the pistons before the associated valves close helps to cushion the shock of the collision, so that whip lash injuries and the like to the operator of the vehicle are minimized.

When the vehicle stops, the hydraulic pump also stops, and the springs retract the bumper and cause the pistons to exhaust the hydraulic fluid from the cylinders through the normally open valves.

Referring now to the drawing by numerals of reference, 12 denotes an automobile (FIGS. 1 and 2), each end of which carries one of my retractable bumper assemblies 11. Each bumper assembly 11 comprises a generally U-shaped bumper bar 15, which is slidably mounted over the adjacent end of chassis or frame 17 of the automobile. The chassis or frame 17 has spaced, parallel side walls 18, and a transverse, end wall 19.

Secured at their forward ends in the transverse wall 19 of the chassis or frame 17, to extend longitudinally of the automobile 12 are two spaced, parallel cylinders 21. Reciprocable in each cylinder 21 is a piston 23. Projecting slidably through the forward end of each cylinder 21, and through the juxtaposed transverse wall 19 is a piston rod 25. Each rod 25 is secured at one end to one of the pistons 23, and at its opposite end to the associated bumper bar 15. In each cylinder 21 there is a compression spring 27 which is disposed between the outer end of the cylinder, and the associated piston 23, thereby constantly to urge the latter toward the inner end of the cylinder, to move the bumper 15 to retracted position.

The inner end of each cylinder 21 is closed by a hollow valve block 30 (FIG. 5), which comprises two generally cup-shaped portions 31 and 32, the recessed ends of which are secured in confronting, coaxial relation to form therebetween a chamber 34. Each block 30 has in one end thereof a port 36, which connects its chamber 34 with the interior of the associated cylinder 21. The opposite end of the block is connected through port 38 and a flexible conduit 39 to the output side of hydraulic pump 40.

Mounted in each block 30 to reciprocate in its chamber 34 is a generally disc-shaped valve 42, which in different positions closes off the ports 36 and 38. Pins 44, which project from opposite ends, respectively, of the valve 42 extend slidably through the ports 36 and 38, respectively, to support and guide the valve 42 in its reciprocation. Each pin 44 is surrounded by a compression spring 46, one end of which engages the inside of the valve block 30 at one end thereof, and the opposite end of which engages the confronting end of the valve 42. These two springs 46 hold the valve 42 resiliently in its open position substantially midway between the ports 36 and 38 when the vehicle engine is shut off.

At its left end (FIG. 5), the valve 42 is beveled and has a conical surface 48. The surface 48 is provided with a plurality of equi-angularly spaced grooves 49 which communicate with grooves 50 in the forward face of the valve. At its opposite end valve 42 is provided with a further plurality of angularly spaced, radially extending grooves 51, which extend from the periphery of the valve 42 inwardly toward the axial centerline thereof.

The pump 40 is geared to the drive shaft 53 (FIGS. 3 and 4) of the automobile. Pump 40 contains a conventional relief valve (not illustrated), which is set to limit the hydraulic pressure that can be developed in the associated cylinders 21. Pump 40 may be connected to the engine crankcase 55 containing the usual supply of lubricating oil, which may serve as the reservoir of fluid for pump 40. However, if desired, the pump may be connected to a separate reservoir or other source of fluid supply on the vehicle.

When the automobile 12 is at a standstill, the bars 15 of its front and rear bumper assemblies 11 are retracted as illustrated in FIGS. 1 and 3. When the auto is in operation, however, the drive shaft of the automobile drives hydraulic pump 40. Fluid is pumped therefore through lines 39, to the interior of the cylinders 21.

The fluid, that is pumped into the cylinders 21, forces the associated pistons 23 toward the outer ends (left ends in FIGS. 3 and 4) of their cylinders, thus compressing the associated springs 27, and moving the associated bumper 15 from its retracted to its advanced position, as illustrated, for example, in FIGS. 2 and 4. When the pistons 23 reach their extreme outermost positions in their respective cylinders 21, the pressure of the fluid in these cylinders will have reached the value for which the relief valve in pump 40 is set. The relief valve therefore opens to allow hydraulic fluid to be recirculated by the pump 40. The front and rear bumpers 15 are thus maintained in their advanced positions until the drive shaft of the automobile 12 is once again stopped. Then the pump 40 stops and the springs 27 urge the pistons 23 rearwardly in the cylinders 21, thereby exhausting hydraulic fluid from the cylinders.

When the bumpers 15 are in their extended positions, they tend to absorb the shock of a collision of the auto with another auto or object. When, for example, the front bumper 15 is struck head-on by an object, the force of the collision urges the bumper suddenly inwardly (to the right in FIG. 4) so that the fluid in the associated cylinders 21 is suddenly subjected to an extreme increase in pressure. This sudden surge of pressure causes the two associated valves 42 to be urged rearwardly in their valve blocks 30, to close the ports 38, so that fluid is trapped in the cylinders 21. The associated bumper 15 thus first yields and then is held firmly by the fluid trapped in the cylinders 21. As a result the bumper 15 absorbs substantially the full impact of the collision.

When a valve 42 is closed over its associated port 38 the radial grooves 51 in the right end of the valve (FIG. 5), allow fluid in the chamber 34 to pass radially through the grooves 51 to a counterbore 61, which surrounds the associated port 38, and hence to the adjacent conduit 39. As a result, each valve 42 never can really close off completely its associated port 38, but in effect throttles the flow of fluid through the port; and in this respect, each of the valves 42 functions as a throttle valve in its respective line or conduit 39. This permits the associated bumper bar 15 to move slowly toward its retracted position, when the impact thereagainst is sustained. This feature provides a secondary dash-potting effect. The grooves 51 are designed so as to provide optimum resistance to the escape of fluid, so that a bumper 15, in yielding to impact, may afford maximum protection to the vehicle 12 and its passengers.

The grooves 49 are designed to allow a slight seepage of fluid through the port 36, if for some reason during the operation of pump 40, valve 42 is urged to its other closed position against the left end of the chamber 34 as shown in FIG. 5.

In the event of a diagonal or oblique, rather than a head-on collision with one of the bumper assemblies on the vehicle 12, the force of the impact would be inclined at an angle less than 180° with respect to the axes of the associated cylinders 21. To afford protection to the automobile in such instances, each bumper assembly 11 may be constructed of materials that will bend, or collapse, upon being struck in such an oblique manner, and thereby absorb the impact.

FIGS. 6 and 7, wherein like numerals are employed to designate elements identical to those shown in FIGS. 1 to 5, illustrate a modified bumper assembly, in which each bumper 15 is secured to the outer ends of two, rectangular piston rods 125, which are mounted to reciprocate in housings 121. Rotatably mounted in each housing 121 adjacent the outer or forward end thereof are two sets of roller bearings 131 and 132, respectively. In each housing bearings 131 have rolling engagement with the two lateral sides of the associated rod 125, and bearings 132 have rolling engagement with the top and bottom sides of this rod. This assembly is otherwise identical in construction and operation to the bumper assembly 11. The rectangular piston rods 125 and the associated bearings 131 and 132, however, provide additional resistance to oblique collisions, as compared to the resistance afforded by the bumper assembly 11.

From the foregoing it will be apparent that applicant has devised a relatively simple and reliable safety bumper, which avoids shortcomings of prior, like bumpers. Applicant's novel bumper advances into a protective position during the operation of an automobile, and retracts automatically, when the automobile is stopped, so as not to interfere with parking the car. Unlike prior such devices, the claimed bumper resists impact almost immediately upon being struck; and does not tend to rebound after absorbing the shock of a collision. Moreover, since opposite ends 16 of each of applicant's bumpers 15 overlap opposite sides of the automobile or of the associated housing 17, even when the bar is extended, there are no recesses or spaces between the advanced bar and its housing with which a passing vehicle might accidentally engage or lock.

While the invention has been described in connection with different specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention on the limits of the appended claims.

Having thus described my invention, what I claim is:
1. In an automotive vehicle having means for driving the vehicle,
 (a) a protective bumper disposed at one end of said vehicle and reciprocable thereon between extended and retracted positions,
 (b) fluid pressure operated means connected to said driving means to supply fluid in a direction to move said bumper to its extended position, when said drive means is operative,
 (c) spring means for constantly urging said bumper to its retracted position, and

(d) a throttle valve for throttling the return flow of the fluid thereby to cushion retracting movement of said bumper, when said driving means is operative, (e) said spring means operating to return said bumper wholly to its retracted position, when said driving means is inoperative.

2. A safety bumper assembly for an automotive vehicle having a rotatable drive shaft, comprising:
(a) an elongate bumper bar,
(b) reciprocable means for mounting said bar on one end of the vehicle to extend transversely between opposite sides thereof, and for reciprocation between retracted and advanced positions, respectively, relative to said one end of the vehicle,
(c) fluid-pressure operated means connecting said reciprocable means to the drive shaft and operative upon rotation of said shaft to move said bar from its retracted to its advanced position, and
(d) a throttle valve through which fluid flows freely in one direction during the movement of said bumper bar to its advanced position,
(e) said valve being operative in response to a sudden load on said bar tending to move said bar from its advanced toward its retracted position to throttle the flow of fluid in the opposite direction through said valve, thereby to cushion the reverse movement of said bar.

3. A safety bumper assembly as defined in claim 2, wherein:
(a) a housing is secured to the vehicle adjacent said one end thereof,
(b) a piston is reciprocable in said housing,
(c) a piston rod is secured at one end to said piston, and is operatively connected at its opposite end to said bar,
(d) resilient means constantly urges said piston in a direction to move said bar to retracted position, and
(e) means is operative upon the rotation of said drive shaft to pump hydraulic fluid under pressure through said valve and into said housing to urge said piston to advanced position against the resistance of said resilient means to move said bar to advanced position.

4. A safety bumper assembly as defined in claim 3, wherein:
(a) at one end thereof said housing is connected by a duct to said pump means,
(b) said valve is mounted to reciprocate in a recess formed in said housing adjacent said one end thereof to control the flow of fluid through said duct,
(c) a valve seat is formed in said housing for engagement by said valve upon sudden rearward movement of said bar, thereby substantially to close said duct, and
(d) a spring is interposed between said valve seat and said valve, and is operative to resist movement of said valve toward its seat.

5. A safety bumper assembly as defined in claim 4, wherein one of the confronting surfaces of said valve and said seat has therein a plurality of spaced recesses for allowing at least a slight flow of fluid from said housing, when said valve is in closed position against its valve seat.

6. A safety bumper assembly as defined in claim 4, wherein:
(a) a second valve seat is formed in said housing opposite to the first-named seat, and
(b) a second spring is interposed between said valve and said second seat resiliently to urge said valve away from said second seat and toward its normally-open position in which said valve is spaced from both said seats.

References Cited
UNITED STATES PATENTS

| | | | |
|---|---|---|---|
| 1,373,549 | 4/1921 | Brinkman et al. | 180—83 |
| 1,528,617 | 3/1925 | Klotz | 293—86 |
| 2,185,936 | 1/1940 | Yamada | 180—83 |
| 2,191,368 | 2/1940 | Cavanaugh | 293—73 |
| 2,404,931 | 7/1946 | Somervell | 293—86 |
| 2,600,060 | 6/1952 | Lopes et al. | 293—85 |
| 2,873,994 | 2/1959 | Omps | 293—73 |
| 3,134,619 | 5/1964 | Harrison et al. | 293—73 |

ARTHUR L. LA POINT, *Primary Examiner.*

H. BELTRAN, *Assistant Examiner.*